Sept. 19, 1961    T. W. KUNZOG    3,000,370
CYLINDER LINER AND VALVE SEAT ASSEMBLY
Filed Nov. 9, 1959    2 Sheets-Sheet 1

INVENTOR.
THEODORE W. KUNZOG
BY
HIS ATTORNEY

Sept. 19, 1961 T. W. KUNZOG 3,000,370
CYLINDER LINER AND VALVE SEAT ASSEMBLY
Filed Nov. 9, 1959 2 Sheets-Sheet 2

INVENTOR.
THEODORE W. KUNZOG
BY
HIS ATTORNEY

United States Patent Office 3,000,370
Patented Sept. 19, 1961

3,000,370
CYLINDER LINER AND VALVE SEAT ASSEMBLY
Theodore W. Kunzog, Dayton, Ohio, assignor to General Motors Corporation, Detroit, Mich., a corporation of Delaware
Filed Nov. 9, 1959, Ser. No. 851,753
6 Claims. (Cl. 123—193)

This invention relates to internal combustion engines and compressors and is particularly concerned with combinations of cylinder liners, valve seats and valve guides for such devices.

It is the main object of the invention to provide an improved cylinder liner and valve assembly which may be cast in place in an aluminum block wherein the relation of the liner, valve seat and valve guide is predetermined.

It is a further object to provide a block assembly made from aluminum or the like with sintered metal cylinder liners, valve seats and valve guides wherein all of the sintered parts are positioned with respect to one another with great accuracy prior to the casting operation.

In carrying out this object, it is a further object to form the cylinder liner with a key or keyway and form the valve guides and valve inserts with interlocking keyways whereby the said parts may be assembled prior to casting in the block and wherein all of the parts are held in a predetermined accurate relation to one another thereby eliminating the necessity of subsequent machining and the like.

Further objects and advantages of the present invention will be apparent from the following description, reference being had to the accompanying drawings wherein preferred embodiments of the present invention are clearly shown.

In the manufacture of internal combustion engines, compressors and similar devices, it is highly advantageous to use a light high heat conducting metal such as aluminum or aluminum alloys for the block structure. This metal, however, is not as wear resistant or as heat resistant as iron or steel and, therefore, liners are generally used in blocks formed from aluminum. These liners are used in the cylinder bore and are also used on the valve seats and valve guides.

It is general practice to position the liners in a mold and cast the aluminum therearound whereupon the various parts are precision bored to provide the desired dimensions. Another procedure used to make up these composite blocks is to insert the liners in a previously cast aluminum block. In this instance, the aluminum block must be accurately bored to receive the liners in desired relation and frequently it is necessary to further machine the liners after their insertion.

The present invention is directed to a block assembly wherein aluminum is used for the major portion of the block and wherein sintered metal liners and seats and guides are used which are so inter-related that they can be cast directly into the block and require no subsequent boring in order to establish their proper dimensional positions.

This is accomplished by forming the liner, seats and guides from metal powder wherein precision sintered parts can be formed that require no subsequent machining and wherein the parts have formed thereon interlocking means for assembling the parts one to the other so that all of the parts are in proper alignment and position. This subassembly is then placed in a mold with necessary cores and the aluminum is cast therearound making a unitary assembly of high precision at a reduced cost.

Figure 1:
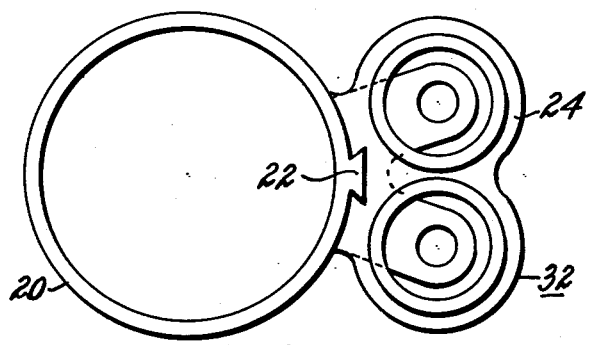
FIGURE 1 is a plan view of a sintered metal cylinder liner, valve seat and valve guide assembly.
Figure 2:
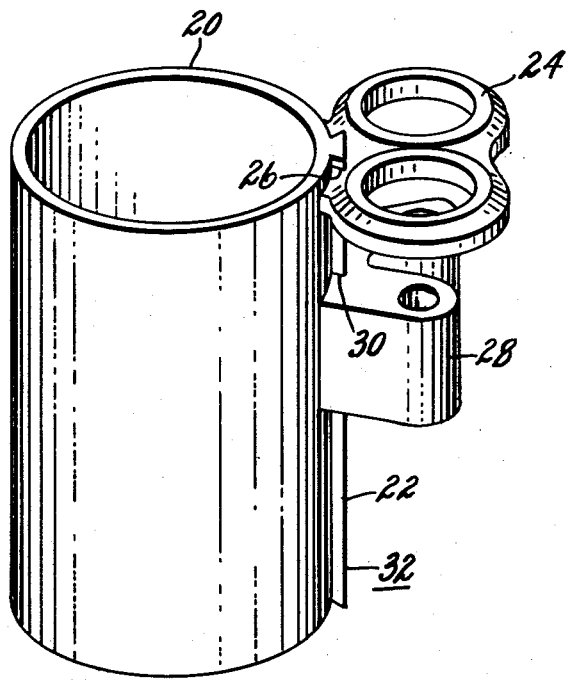
FIGURE 2 is a view in perspective of the assembly shown in FIGURE 1.
Figure 3:
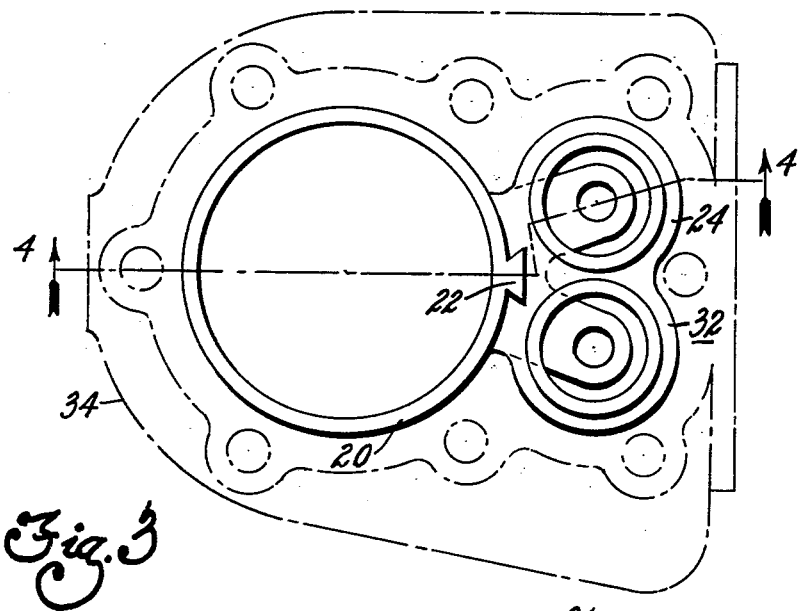
FIGURE 3 is a plan view of a cylinder block with the assembly of FIGURE 1 in place.
Figure 4:
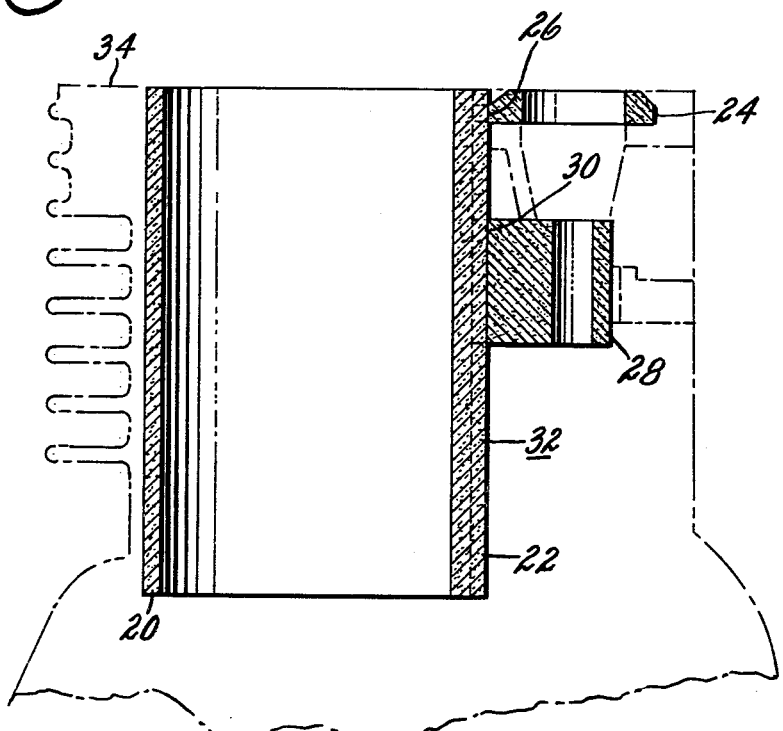
FIGURE 4 is a sectional view taken on line 4—4 of FIGURE 3.

Specifically referring to the drawings, a cylinder liner is shown at 20 in FIGURE 1 which includes a longitudinally extending dove-tailed interlock 22 thereon. A valve seat 24 includes a dove-tailed groove 26 therein which fits over the dove-tail 22 on the liner. The valve stem guide is shown at 28 and also includes a dove-tailed groove 30 therein permitting the guide to be interlocked with the dove-tail 22 on the liner. In assembling this group of parts, the guide 28 and the seat 24 are pressed onto the dove-tail 22 to the desired position longitudinally of the cylinder liner and, thereafter, the parts are maintained in this position by pressure fit of the dove-tailed parts. This forms an assembly 32 which is then placed in a mold with necessary cores and a block 34 is cast therearound from aluminum or aluminum alloy.

The parts 20, 24 and 28 are preferably made from sintered porous metal such as sintered porous iron with appropriate quantities of carbon mixed therethrough. These sintered ferrous parts have high wear qualities and are adapted admirably for the purpose at hand. Furthermore, since the parts are formed in precision dies wherein metal powders are compacted to the exact size and shape, little or no machining is required to produce the desired finished part. In fact, in most instances, the part is merely sized after sintering in the conventional sizing aparatus used in powder metallurgy.

The sintered metal is slightly porous in nature as is well known and permits oil penetration into its structure which reduces friction and improves the life of the engine or compressor.

The use of the assembly of parts as described herein eliminates the necessity of positioning the separate parts within a mold and also eliminates the possibility of shifting of the parts during the pouring of the aluminum whereby more accurate and improved structures are formed.

The powder metallurgy involved in the manufacture of the porous ferrous parts forms no part of this invention and is conventional in the art. In this connection, attention is directed to Lenel Patent 2,191,936 which discloses methods for making articles from sponge iron including carbon and which also discloses means for controlling dimensions of the articles formed. Similarly, in Tormyn 2,287,592, methods for making articles from iron powders are disclosed. It might be said here, however, that under certain conditions, it may be desirable to treat the iron to obtain specific wear characteristics therein. One such treatment includes a steam treatment as set forth in Lenel Patent 2,187,589. In this treatment, the porous surface of the article becomes coated with black iron oxide which not only is corrosion resistant but which changes the frictional characteristics of the article. Similarly, if the process is carried out for a long enough period, it is possible to completely fill the pores of the porous structure with the oxide. Other surface treatments may also be used if desired and all of these are outside the scope of this invention which is specifically directed to the interrelation of the several parts of an internal combustion engine or compressor wherein valves, valve guides and cylinder liners are made from compacted and sintered metal powders and wherein the parts, due to precision manufacture, can be assembled prior to casting of the cylinder block therearound so that the parts are in proper relation, one to the other and do not require subsequent machining operations.

A specific example for making the sintered iron parts is as follows. Sponge iron powder of 100–150 mesh having 1% by weight of graphite powder mixed therewith, is filled into a die and is compressed at a pressure in the order of 40,000 pounds per square inch to the desired form of the part. This green briquette is taken from the die in self-sustaining form and sintered for about thirty minutes under nonoxidizing conditions at 2050° F. After cooling under nonoxidizing conditions, the part may be sized by cold pressing to the exact size desired. The part is now ready for use.

It is also understood that, in some instances, the particular metal used in the valve guides may be different from the metal used in the liner or seats. In some instances, it is desirable to utilize lead or other metal or metals in small quantities up to 10% to 15%, intermixed with the iron as lubricating or alloying metals for the guides and seats and this invention comprehends such variations in chemical composition of the parts being used. It is further understood that the same procedures may be employed to produce assemblies for integral casting with other types of mechanism for example, air compressors, pumps and the like wherein cylinder liners, valve seats and valve guides require interrelated positioning of high accuracy.

It is understood that, while line boring and machining is eliminated by this assembly, it may be desirable to subsequently hone and/or finish machine the inserts without departing from the spirit of my invention which broadly comprehends using precision parts positively positioned with respect to one another prior to casting.

The present set-up is particularly desirable where die casting rather than sand casting is used to form the block. In this case, due to the high presures involved, the incoming metal tends to shift the several parts which creates many problems. By using the present invention with the parts positively positioned relative to one another shifting is prevented.

While the embodiments of the present invention as herein described constitute preferred forms, it is to be understood that other forms might be adopted.

What is claimed is as follows:

1. A cylinder block assembly, comprising in combination, a predominantly aluminum integrally cast block including a sintered high melting point metal cylinder liner, valve guide and valve seat, said liner having integral means thereon for cooperating with integral positioning means on said guide and seat for interlocking said liner, guide and seat in predetermined fixed relation with respect to one another within said integrally cast block.

2. A cylinder block assembly, comprising in combination, a predominantly aluminum integrally cast block including a sintered higher melting point metal cylinder liner, valve guide and valve seat, said liner having means thereon for cooperating with positioning means on said guide and seat whereby the relative positions of said liner, guide and seat are predetermined with respect to one another within said integrally cast block, wherein the first and second means consists of a laterally extending interlock and a pair of cooperating interlocks.

3. A cast predominantly aluminum block assembly, comprising, a finned block having cast therein a cylinder liner, a valve seat and a valve guide, said liner having a laterally extending interlock therealong and said seat and guide including cooperating parts for interfitting therewith whereby said liner, seat and guide may be positioned in definite assembled relation prior to casting of the block therearound, said liner, seat and guide being formed from sintered and compacted ferrous metal.

4. A cast predominantly aluminum block assembly, comprising, a finned block having cast therein a cylinder liner, a valve seat and a valve guide, said liner having a longitudinally protruding dovetail interlock extending along its outer surface, said seat and guide each having an external interlock for mating with said dovetail interlock whereby the seat and guide may be positioned and held with respect to the liner in predetermined position therewith prior to casting of the block therearound, said liner, seat and guide being formed from compacted and sintered ferrous material.

5. In a method for making a cast aluminum cylinder block assembly including a porous sintered liner having an integral locating device thereon, and a valve seat and valve guide, said seat and guide each having a locating device thereon adapted to interlock with the locating device on the liner for positively positioning the seat and guide with respect to the liner, the steps comprising; assembling the porous sintered metal parts with said locating devices in cooperating relation so as to fix the position with respect to one another, positioning the assembly of the liner, seat and guide in a fixed position within a mold, and then casting a predominantly aluminum block therearound.

6. A cylinder block assembly, comprising in combination; a high melting point metal cylinder liner, a high melting point metal valve seat, positive interlocking means carried by said liner and seat for positioning the said seat in a positive predetermined relation to said liner, and a cast-in-place predominately aluminum cylinder block surrounding said assembled seat and liner for maintaining the seat in said predetermined relation with the liner.

References Cited in the file of this patent

UNITED STATES PATENTS

| | | |
|---|---|---|
| 1,928,411 | Cross | Sept. 26, 1933 |
| 2,227,933 | Hersey | Jan. 7, 1941 |
| 2,280,660 | Newcomb | Apr. 21, 1942 |
| 2,456,272 | Gregory | Dec. 14, 1948 |